United States Patent [19]
Ban

[11] 3,752,484
[45] Aug. 14, 1973

[54] MAGNETIC TAPE CARTRIDGE PLAY CONTROL MEANS

[76] Inventor: Itsuki Ban, 829 Higashi-Oizumimachi, Tokyo, Japan

[22] Filed: Sept. 28, 1970

[21] Appl. No.: 75,876

[30] Foreign Application Priority Data

Sept. 26, 1969 Japan .............................. 44/76237

[52] U.S. Cl. .......... 274/4 F, 274/4 A, 179/100.2 Z, 179/100.2 CA
[51] Int. Cl. ...................... G11b 21/12, G11b 23/12
[58] Field of Search ................. 274/4 A, 4 F, 11 A; 179/100.2 Z, 102 CA

[56] References Cited

UNITED STATES PATENTS

| | | | |
|---|---|---|---|
| 3,127,178 | 3/1964 | Osborne | 274/4 F |
| 3,572,723 | 3/1971 | Jenkins | 274/4 A |
| 3,589,733 | 6/1971 | Piotrowski | 274/4 F |

*Primary Examiner*—Louis R. Prince
*Assistant Examiner*—Dennis A. Dearing
*Attorney*—Jacobs & Jacobs

[57] ABSTRACT

In a magnetic tape player utilizing a plurality of endless magnetic cartridges which is capable of playing the cartridges in such a successive manner that the next cartridge is automatically brought to the play position upon completion of the preceding cartridge held in the play position, magnetic tape cartridge play control means comprises a movable deck to which a rotatable capstan for playing the cartridge in the play position is mounted, a latch lever for retaining the deck in the reproducing position where the cartridge is engaged thereby in the play position, and an actuating member for moving the latch lever to the position establishing disengagement from the deck in response to completion of the cartridge in the play position thereby allowing the deck to be retracted from the reproducing position, whereby the next cartridge is brought to the play position in response to retraction of the deck from the reproducing position, and the play of the cartridge is initiated by return movement of the deck to the reproducing position.

5 Claims, 5 Drawing Figures

PATENTED AUG 14 1973

3,752,484

SHEET 1 OF 3

MAGNETIC TAPE CARTRIDGE PLAY CONTROL MEANS

BACKGROUND OF THE INVENTION

This invention relates to a tape cartridge player utilizing a plurality of endless magnetic tape cartridges, and more particularly to magnetic tape cartridge play control means wherein the cartridges are played in such a successive manner that the next cartridge is brought to the play position for its play in response to completion of the preceding cartridge held in the play position.

Various tape cartride players have been heretofore proposed, that contain a plurality of endless magnetic tape cartridges to play the cartridges in successive manner. Such is required of a tape player of the class above mentioned that exchange of the cartridge to be played is made in response to completion of reproduction of all or a predetermined of all or a predetermined record tracks on the magnetic tape within the cartridge in the play position. It is necessary to retractively move members such as a capstan, magnetic tape and the like for playing the cartridge held in the play position from the cartridge when exchange of the cartridge is made. In other words, a movable deck to which the capstan is mounted should be moved in exchange of the cartridge.

SUMMARY OF THE INVENTION

It is, therefore, a primary object of the invention to provide magnetic tape cartridge play control means for a magnetic tape player utilizing a plurality of endless magnetic tape cartridges, wherein a movable deck to which a rotatable capstan and a magnetic head for playing the cartridge is permitted to move back from the reproducing position engageable with the deck in response to completion of the play of the cartridge held and played in the play position, and exchange of the cartride to be played is made in response to retractive movement of the deck.

Another object of the invention is to provide magnetic tape cartridge play control means for a magnetic tape player utilizing a plurality of endless magnetic tape cartridges, wherein a cam member is provided to allow the magnetic head to synchronize with the tracks on the tape within the cartridge in the play position and shift the tape across the same, said cam member being rotated through one revolution to allow the magnetic head to scan the tracks on the tape, and wherein a latch lever for retaining the deck in the reproducing position is moved to permit disengagement from the deck to thereby retract the deck from the reproducing position.

A further object of the invention is to provide magnetic tape cartridge play control means for a magnetic tape cartridge player utilizing a plurality of endless magnetic tape cartridges, wherein the latch lever is actuated by a projective portion formed on the cam member and is moved to establish disengagement from the deck.

These and other objects, features and advantages of the invention will become more apparent through the following description by reference meade to the attached drawings, in which:

DESCRIPTION OF THE PREFERRED EMBODIMENTS

Figure 1:
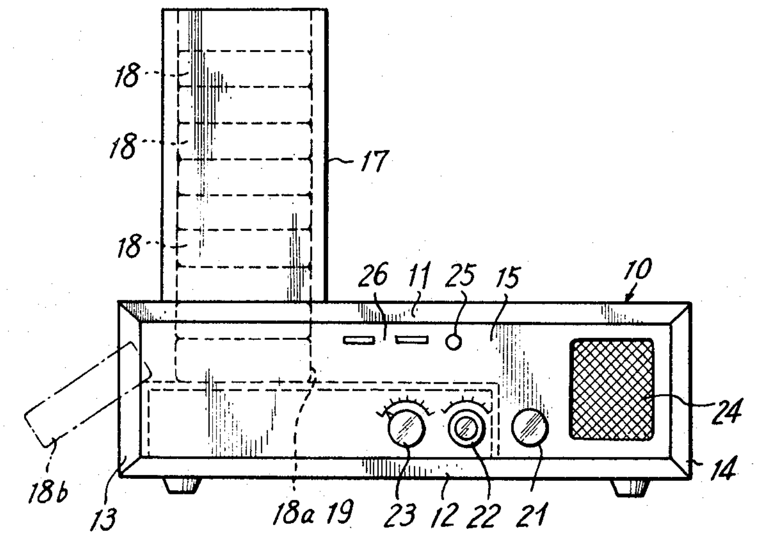
FIG. 1 is a front view of a magnetic tape cartridge player according to the invention.

In FIG. 1, there is shown a tape playing cabinet 10, having top and bottom walls 11, 12, oposed side walls 13, 14, a front wall 15 and a rear wall (not shown). Vertically mounted to the top wall 11 of the cabinet 10 is a bottomless enclosure 17 receiving a stack of plurality of the cartridge 18. The enclosure 17 is of a hollow, square pillar and is adapted to receive the cartridges 18 from the upper opening. The top wall 11 is bored through at a portion opposed to the enclosure 17 to allow the lowermost cartridge 18 to rest on a horizontal platform 19 provided within the cabinet 10. According to the invention, the cartridge 18a which rests on the platform 19 is played and finishes its play and the escaped from the cabinet 10 through an opening 20 (FIG. 3) to assume a position indicated at 18*b*. This allows the next cartridge to fall down by its dead weight load to the platform 19 and to rest thereon for its play.

In this manner, the cartridge 18 received in the enclosure 17 are successively played from the lowermost to the uppermost one. The cabinet 10 is provided at its front wall 15 with a power control knob 21 used for controlling operation of the tape player, a volume control knob 22 used for controlling volume of the reproducing sound made out from a speaker 24 on the front wall, and a control knob 23 for a stereo balance setting. A track or channel selection pushbutton 25 on the front wall 15 allows of a change of the track on the magnetic tape. A new track or channel will be selected at each time the pushbutton 25 is depressed and released. The track indicator 26 is provided to show the selected track when the pushbutton 25 is pushed and has selectively lighting lamps corresponding two tracks in this instance.

Figure 2:
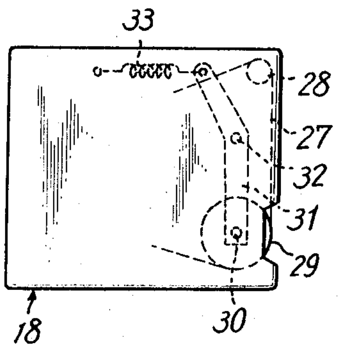
FIG. 2 is a plan view of the endless magnetic tape cartridge to be played by the player in FIG. 1.

In FIG. 2 the cartride 18 is shown as being played by this player. The tape cartridge 18 includes a generally rectangular housing with a centrally disposed reel assembly (not shown) on which an endless magnetic tape 27 is wound and unwound in conventional manner. The tape 27 passes over a tape guide 28 and a pinch roller 29. The pinch roller 29 is supported by a shaft 30 on one end of a lever 31 which is rotatively supported by a pivot 32 fixed to the base plate of the housing. The pinch roller 29 is urged by a spring 33 in the direction of leading edge of the cartridge. The tape guide 28 and the pinch roller 29 are disposed adjacent the leading edge of the cartridge whereat the cartridge side wall is cut away or despensed with and the tape 27 is extended from the center of the hub of the reel (not shown) about the guide 28 and thence about the pinch roller 29 back to the other periphery of a roll formed by the tape wound about the hub.

Figure 3:
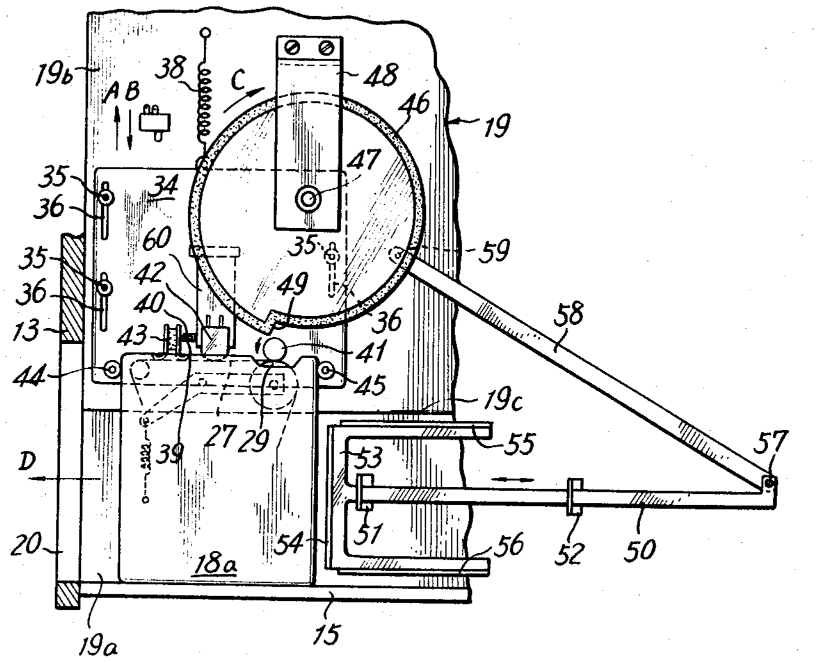
FIG. 3 is a plan view of the player in FIG. 1, but showing the mechanism inside thereof.

FIG. 3 shows a mechanism provided in the cabinet 10, wherein similar numerals are used to illustrate like parts in FIGS. 1 and 2. The horizontal platform 19 has a high surface portion 19*a* and a low surface portion 19b defined by step portion 19*c*.

Numeral 34 is a deck which is slidably supported by guide rods 35 that pass through elongated slots 36 formed in the deck and mounted to the lower surface portion 19*b* of the platform 19. Upward and downward movement of the deck 34 is limited by rings 37 mounted to the rods 35. On the other hand, the deck 34 is intended to be moved in the direction of arrow A by a tension spring 38. As shown, the deck 34 is shown as being held in a reproducing position against the bias of the tension spring 38 since a hook hole 39 bored through the deck 34 is engaged by a latch lever 40 provided to the platform 19. The latch lever 40 as will be detailed later, it is movably provided to the platform 19 at its rear side by a suitable support member (not shown). The latch lever 40 has one upper end upwardly extending through an opening (not shown) bored through the platform 19. The latch lever 40 is also adapted to allow the upper end thereof to be received in the hook hole 39 in the deck 34. The latch lever 40 is normally and upwardly urged by a spring (not shown) to engage the hook hole 39 and is moved downwardly against the bias of the spring (not shown) to permit disengagement from the hook hole 39 when the play of the cartridge by a moving device the detail of which is not shown since it dows not form this invention. A rotatable capstan 41 is provided to the deck 34 to abut against the pinch roller 29 in the cartridge 18*a* which is escaped from the enclosure 17 and rests on the high surface portion 19*a* of the platform 19 to drivingly transport the tape 27 in the cartridge. Further, a magnetic head 42 for reproducing the tape 27 in the cartridge, an endmark detector 43 for controlling operation of magnetic head shift means for changing over the record tracks of the magnetic tape within the cartridge 18*a* to be played by shifting the magnetic head 42, are also provided to the deck 34. The capstan 41 is rotatably supported by a suitable bearing 76 (FIG. 4) mounted to the deck 34 and upwardly extends through a hole (not shown) bored through the deck. The capstan 41 is rotatably driven in the direction of the arrow as shown by capstan driving means including a motor (not shown) mounted to the deck thereunder. In addition to the capstan 41 and the magnetic head 42, there are provided on the deck 34 guides 44, 45 for securing relative position of the cartridge 18*a* in the play position with respect to the deck. When the deck 34 is in the reproducing position, the capstan 41 abuts against the pinch roller 29 within the cartridge 18a in the play position and the tape 27 within the cartridge is drivingly transported across the magnetic head 42, as well known, by coaction of the capstan 41 with the pinch roller 29.

The tape cartridge player includes deck driving means for slidably moving the deck 34 between the reproducing position and a retracted position where the capstan 41 is disengaged from the pinch roller 29 within the cartridge 18*a*. The deck driving means has a rubber covered eccentric cam idler wheel 46 rotatably supported by an axis 47 attached to the one end of a support member 48 the other end of which is secured to the platform 19. The wheel 46 includes a step portion 49 at a portion of the periphery farthest away form the axis 45. The wheel 46 as will be fully described later is provided to oppose to the capstan 41 so as to allow it to abut against the capstan 41 and to be rotated in the direction of arrow C. When the deck 34 is retained in the reproducing position upon engagement of the hook hole 39 with the latch lever 40, the wheel 44 is regulated by the step portion 49 and keeps away from the capstan 41. If the latch lever 40 is moved to permit disengagement from the hook hole 39, the deck 34 is slided in the direction of arrow A from the reproducing position by the bias of the tension spring 38. This causes the capstan 41 to abut against the wheel 46 to rotatably drive the latter in the direction of arrow C. The deck 34 is gradually moved in the direction of arrow A under control of the eccentric cam idler wheel 46 at this moment. When the wheel 46 is rotated through about a half revolution, the deck 34 is moved to the retracted position farthest away from the reproducing position and then is moved in the direction of arrow B against the bias of the tension spring 38 as the wheel 46 is rotated. About one revolution of the wheel 46 returns the deck 34 to the reproducing position as shown and the deck 34 is prevented from further moving by engagement of the latch lever 40 with hook hole 39. The wheel 46 is rotated through one revolution until the eccentric portion thereof passes over the capstan 41 and is regulated by the step portion 49 to establish disengagement from the capstan 41. The motor for rotating the capstan and the magnetic head shifting means are provided, through not shown in FIG. 3, below the deck 34 so that the platform 19 is provided with a suitable opening at a portion thereof opposed to the deck 34 to allow them to pass there through.

The tape cartridge removing apparatus functions to move the cartridge 18a placed on the platform 19 in the direction of arrow D to escape it from the opening 20 in the side wall 13 of the cabinet outwardly of the cabinet 10 during the time that the deck 34 is reciprocally moved by the deck moving means between the reproducing position and the retracted position. The tape cartridge removing apparatus includes a pushing lever 50 slidably supported to be movable in the direction of the arrow as shown by a substantially L-shaped support or guide members 51, 52 fixed to the platform 19. The pushing lever 50 is provided at one end with a substantially U-shaped head member 53 integrated therewith. The head member 53 has bent portions 54, 55 and 56 upwardly extending from the peripheral edges thereof. A distance between the respective upper edges of the bent portions 54 to 56 and the platform 19 is less than the thickness of the cartridge 18. The pushing lever 50 is pivoted at its rear end by a pin 57 to a crank pin 58 one end of which is connected to the wheel 46 by a pivot pin 59.

The lowermost of the cartridge 18a of a plurality of them in a stack rests on the high surface 19*a* of the platform 19 and is positioned in the play position. The pushing lever 50 is positioned away from the side wall of the cartridge 18*a* as shown in FIG. 3. When the latch lever 40 is moved from the hook hole 39 to stop the play of the cartridge, the wheel 46 is rotated in the direction of arrow C upon abutment on the capstan 41. As the wheel 46 is rotated, the pushing lever 50 is leftwardly moved gradually by the crank arm 58 and is allowed to contact the cartridge 18*a* by the head member 53 and urge the same whereat the wheel 46 is rotated through a half revolution. The deck 34 has been moved to allow the guide member 44, 45 to be away from the cartridge 18a prior to depression of the pushing lever 50 upon the cartridge 18*a*. Accordingly, the cartridge 18*a* is pushed by the pushing lever 50 and is moved in the direction of arrow D and then is moved out of the cabinet 10 through the opening 20 whereat the wheel 46 is rotated through a half revolution. Further rotation of the wheel 46 reverses movement of the pushing lever 50 while the head member 53 is away from the lower portion of a stack of the cartridges before the wheel 46 is rotated through one revolution whereby the next cartridge falls down on the platform 19 and is allowed to bring the play position. When the wheel 46 is rotated through one revolution, the deck 34 as above described is returned to the reproducing position and the capstan 41 and the magnetic head is engaged by the suceeded cartridge brought to the play position to start the play of the cartridge. As the wheel 46 is prevented from further rotation when it is rotated through one revolution, the pushing lever 50 is maintained at the position as shown in FIG. 3. Since the tape cartridge removing apparatus relies on rotational force of the capstan 41, it provides a force strong enough to move the tape cartridge in the play position to secure removal of the cartridge from the player under stable operation.

Figure 4:
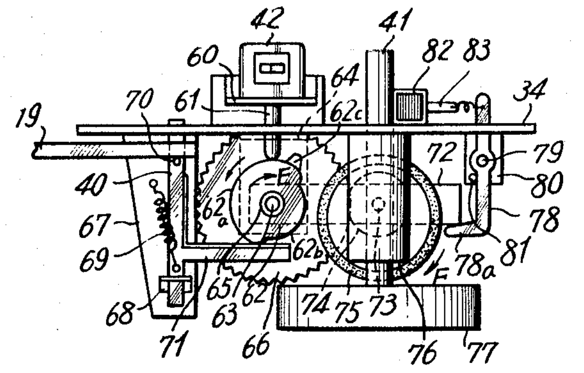
FIG. 4 is a front view of the mechanism shown in FIG. 3.

FIG. 4 shows a mechanism by which the magnetic head 42 is shifted to select the record tracks on the magnetic tape to be played, wherein similar numerals are used to illustrate like parts shown in FIG. 3. The magnetic head 42 is firmly secured to a displaceable member 60 formed of leaf spring which one end of portion is fixed to the deck 34. A pin 61 is fixed to the displaceable member 60 thereunder and donwwardly extends through a hole (not shown) bored through the deck 34. The rounded bottom end of the pin 61 is arranged to ride on a cam 62 which is rotatably provided through a sleeve 65 to an axis 63 fixed to a support member 64 mounted to the deck 34 thereunder.

The sleeve 65 carries a gear 66 connected thereto integrally with the cam 62. The cam 62 is shaped to have two steps 62*a* and 62*b* at different arcs of the periphery thereof so as to shift the magnetic head 42 at two levels by the pin 61 when the cam is rotated. The cam 62 is also provided with a projection portion 62*c* which is formed at the perpery of the cam not to intefere with the pin 61. The latch lever 40 is supported through a guide 68 by a suitable support member 67 fixed to the platform 19 so as to be vertically slidable. The latch lever 40 is normally and upwardly biased by a spring 69, and movement thereof by the bias of the spring 69 is limited by engagement of a stopper pin 70 on the lever 40 with the platform 19. The latch lever 40 includes an arm 71 extending perpendicular to the path of movement of the latch lever, the arm 71 extending downwardly of the cam 62. The projective portion 62*c* is allowed to contact the arm 71 of the latch lever 40, whenever the cam 62 is rotated through one revolution, to move the latch lever 40 to allow the upper end thereof to permit disengagement from the hook hole 39 in the deck 34.

A swingable lever 72 is pivotally supported by the axis 63 on the support member 64. Rotatably supported by an axis 73 mounted to the swingable lever 72 are a gear 74 meshable with the gear 66 and a rubber-covered eccentric idler wheel 75. A gear ratio of the gear 74 and the gear 66 is made 1 : 3 and the gear 66 and the cam 62 is rotated through 120° when the idler wheel 75 is rotated through one revolution. The idler wheel 75 is adapted to be drivingly rotated by abutting against a flywheel 77 connected to the lower end of the capstan 41 supported by the bearing 76 on the deck 34. The swingable lever 72 is given a rotational force in the direction of arrow E by a spring (not shown) so as to allow the idler wheel 75 to abut against the flywheel 77, and movement of the swingable member 72 is prevented by engagement of free end thereof with a bent portion 78*a* of a lever 78 pivotally mounted to a pin 79 on a bracket 80 mounted to the deck 34. When the swingable lever 72 is latched by the lever 78, the idler wheel 75 is maintained not to be rotated by the flywheel 77. The lever 78 is normally given a clockwise rotational force by a spring (not shown), and movement of the lever is limited by a stopper pin 81 on the breacket 80. The upper end of the lever 78 extends through an opening (not shown) formed in the deck 34 upwardly of the deck 34, and a plunger 83 of a solenoid 82 mounted to the deck 34 is connected to the lever 78 at the upper end thereof. The solenoid 82 when energized functions to move the lever 78 to establish disengagement from the swingable lever 72. When the lever 78 is disengaged from the swingable lever 72 upon energization of the solenoid 82 to urge the singable lever 72 in the direction of arrow E, the idler wheel 75 is allowed to abut against the flywheel 77 and then is rotated thereby. Rotation of the idler wheel 75 by the flywheel 77 in the direction of arrow F eccentrically rotates the idler wheel 75 thereby reciprocally pivoting the swingable lever 72 about the axis 63. Thus, when the idler wheel 75 is rotated through one revolution, the swingable lever 72 is returned again to a position to engage the lever 78 if the solenoid 82 is not energized. As a result, pressure force of the idler wheel 75 on the flywheel decays and the idler wheel 75 is prevented from further rotation when rotated through one revolution. This rotates the cam 62 through 120° to thereby shift the magnetic head42.

Figure 5:
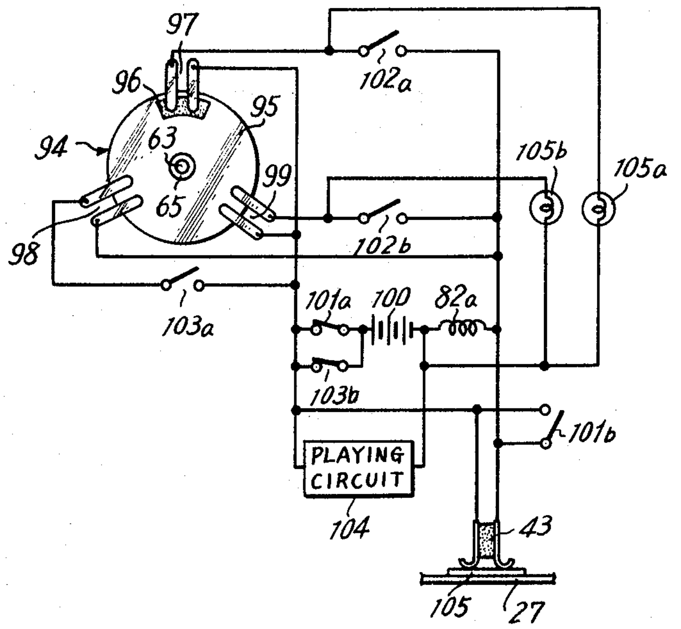
FIG. 5 is a representation for explanatory of the control circuit for the solenoid shown in FIG. 4.

A control circuit for the solenoid 82 is FIG. 5 includes a rotary switching means 94 actuable as the cam 62 is rotated. The rotary switching means 94 comprises a rotary disk 95 mounted to the sleeve 65 carrying the cam 62 and rotatable about the axis 63 with the cam. A conductive piece 96 is provided to the rotary disk 95 at the surface thereof. Switches 97, 98 and 99 each consisting of a pair of contacts are mounted on a fixed member (not shown) of insulation, which is provided corresponding to the rotary disk 95. The switches 97 to 99 are spaced 120° apart from another and successively chosed by the conductive piece 96 due to rotation of the rotary disk 95 as sleeve is rotated.

In series, running from a plus terminal of power source 100 to a minus terminal of the source 100, are a switch 101*a*, the switch 97, a switch 102*a* and an exciting coil 82*a* of the solenoid 82, the switch 101*a* being connected in parallel with a switch 103*b*. In series, running from the plus terminal of the power source 100 to the minus terminal of the source 100, are the switch 101*a*, a switch 103*a*, the switch 98 and the exciting coil 82*a* of the solenoid 82. In series, running from the plus terminal of the power source 100 to the minus terminal of the source 100, are the switch 101*a*, the switch 99, a switch 102*b* and the coil 82*a* of the solenoid. In series, running from the plus terminal of the power source 100 to the minus terminal of the source, are the switch 101*a*, the endmark detector 43 and the coil 43 and the coil 82*a* of the solenoid, the endmark detector 43 being connected in parallel with a switch 101*b*. In series, running from the plus terminal of the source 100 to the minus terminal of the source, are the switch 101*a* and a tape playing circuit 104. A pilot lamp 105*a* is connected in parallel with the switch 102*a* and the coil 82*a* of the solenoid and a pilot lamp 105*b* is in turn connected in parallel with the switch 102*b* and the coil 82*a*. The switch 101*a* and the switch 101*b* are actuated by the power switch knob 21 (FIG. 1) and they are in relationship such that one is closed whereas the other is opened. FIG. 5 shows the power switch knob 21 which has been operated to actuate the player. The switch 103*a* and the switch 103*b* are incorporated in a micro switch 103 which is provided to the platform 19 to be actuated by the deck 34 when the deck 34 is moved to the retracted position, as whown in FIG. 5. Th switch 102*a* and the switch 102*b* are adapted to be manually and selectively operated and closed when the tracks on the magnetic tape to be played are indexed. The playing circuit 104 comprises an amplifier amplifying the output of the magnetic head 42 and the motor driving the capstan. FIG. 5 shows that the playing circuit 104 is supplied with the current from the power source 100 and is thus actuated.

Now, if the switch 102a is closed or a pair of feeler contacts of the endmark detector 43 are shorted by a conductive patch 105 on the magnetic tape 27, the current is applied from the power source 100 to the exciting coil 82*a* of the solenoid 82 to move the lever 78 to permit disengagement from the swingable lever 78. In response to this, as previously described, the idler wheel 75 is rotated through one revolution and the cam 62 and the rotary disk 95 are rotated through 120°. At this moment, the rotary disk 95 is rotated in the direction of arrow as shown to move the conductive piece 96 to close the switch 99. As shown, if the switch 102*b* is opened, the track on the tape corresponding to the switch 102*b* initiates its play, however, the switch 102*b* is closed so that the solenoid 82 is energized by the power source 100 whereby the cam 62 and the disk 95 are rotated through 120°. Therefore, the track on the tape corresponding to the switch 102 is not played. When the disk 95 and the cam 62 are rotated to allow the conductive piece 96 on the disk 95 to close the switch 98, the latch lever 40 is moved to establish disengagement from the deck 34 by the projective portion 62*c* of the cam through the above rotation to initiate reciprocal movement of the deck 34. As the deck is moved, the cartridge in the play position is discharged from the cabinet 10 by the cartridge moving means to substitute the cartridge to be played. Movement of the deck 34 to the retracted position allows the deck 34 to actuate the micro switch 103 closing the switch 103*a*. As a result, the solenoid 82a is energized from the power source 100 to again rotate the cam 62 and the disk 95 through 120° whereby the disk 95 as shown in FIG. 5 to assume a position to close the conductive piece 96 and the switch 97. It will be apparent from the foregoing description that substitution of the cartridge to be played may be automatically made upon play of the two tracks on the tape if any one of the switches 102*a* or the switch 102*b*, for instance, only the track corresponding to the switch 102*b* may be played where the switch 102 is closed. Indication that the track is played is made by lighting either one of the pilot lamp 105*a*, 105*b*. When the power control knob 21 is actuated to stop operation of the player, the switch 101*a* is opened to close the switch 101*b*. Consequently, the solenoid 82 is kept its energization by the power source 100 until the cam 62 is rotated and the latch lever 40 is moved by the projective portion 62*c* to establish disengagement from the deck 34 to thus allow the latter to move form the reproducing position to the retracted position. When the deck 34 is moved to the retracted position and the micro switch 103 is actuated thereby to open the switch 103*b* thereby breaking off the current to the playing circuit to stop operation of the tape player.

It is to be understood that the embodiments of the invention which have been described are merely illustrative of the invention. Numerous modification may be made without departing from the true spirit and scope of the invention. What is claimed is:

1. In a magnetic tape cartridge player utilizing a plurality of endless magnetic tape cartridges wherein the cartridges are played in such a successive manner that the next cartridge is automatically brought to the play position upon completion of the play of the cartridge held in the play position, magnetic tape cartridge play control means comprising a movable deck; a rotatable capstan on the deck, said capstan being adapted to forcedly abut on a pinch roller in the cartridge held in the play position; a magnetic head on the deck; a cam member for allowing the magnetic head to synchronize with the tracks on the tape within the cartridge in the play position and for shifting the tape across the same, cam driving means for intermittently rotating the cam member, said cam driving means being operable in response to a track changing signal to rotate the cam member through a predetermined angle; a control circuit for generating the track changing signal and for controlling operation of the cam driving means; deck driving means for reciprocally moving the deck between a reproducing position where the capstan engages the cartridge in the play position and a retracted position where the capstan is disengaged from the cartridge in the play position; means on said deck for holding a cartridge in the play position, said holding means being operable to engage and hold said cartridge in the play position when said deck is in the reproducing position and to disengage from said cartridge in the play position when said deck is moved away from said reporducing position; means for exchanging a cartridge in the play position with the next cartridge to be played, said exchange means being operable to make said exchange in response to movement of the deck away from said reproducing position; latch means for retaining the deck in the reproducing position; latch means for retaining the deck in the reproducing position, said latch means having a movable latch lever selectively engageable with one portion of the deck and bias means for urging said latch lever to engage the one portion of the deck; an actuating member for moving the latch lever to permit disengagement from the one portion of the deck against the bias of the bias means, said actuating member being synchronously rotatable with the cam member, said actuating member being operable to disengage the latch lever from the one portion of the deck after the cam member has rotated through one revolution to allow the magnetic head to scan all the tracks on the tape within the cartridge in the play position, in response thereto the deck being retracted by the deck moving means from the reproducing position to allow the next cartridge to be brought into the play position.

2. Magnetic tape play control means in accordance with claim 1, wherein said actuating member is a projecting portion provided at the periphery of said cam member.

3. Magnetic tape play control means in accordance with claim 2, wherein said latch lever has an arm extending in proximity of said cam member, the arm being pressed by said projecting portion on the cam member each time the cam member is rotated through one revolution, in response thereto the latch lever being moved to permit disengagement from said one portion of said deck.

4. Magnetic tape cartridge play control means in accordance with claim 3, wherein said one portion of said deck is a hole formed in the deck.

5. Magnetic tape cartridge play control means in accordance with claim 1, wherein said control circuit includes a detector on the deck for generating said track changing signal in response to the passage of the ending of each track on the tape within the cartridge.

* * * * *